United States Patent
Yang et al.

(10) Patent No.: US 9,435,484 B1
(45) Date of Patent: Sep. 6, 2016

(54) SAFETY CATCH CONNECTOR

(71) Applicants: Aerohook Technology Co., Ltd., Taichung (TW); Kai Chieh Yang, Taichung (TW)

(72) Inventors: Kai Chieh Yang, Taichung (TW); Yi Ching Lin, Taichung (TW)

(73) Assignee: AEROHOOK TECHNOLOGY CO., LTD., Monterey Park, CA (US)

( * ) Notice: Subject to any disclaimer, the term of this patent is extended or adjusted under 35 U.S.C. 154(b) by 0 days.

(21) Appl. No.: 14/712,919

(22) Filed: May 15, 2015

(51) Int. Cl.
*F16B 45/04* (2006.01)
*F16M 13/02* (2006.01)

(52) U.S. Cl.
CPC ............ *F16M 13/022* (2013.01); *F16B 45/04* (2013.01)

(58) Field of Classification Search
CPC ....... B66C 1/36; F16M 13/022; F16B 45/04; F16B 45/00
USPC ....... 248/200; 24/600.4, 600.5, 600.6, 600.8, 24/598.4, 598.7, 598.8, 599.9; 294/82.23
See application file for complete search history.

(56) References Cited

U.S. PATENT DOCUMENTS

| | | | | |
|---|---|---|---|---|
| 5,362,117 A * | 11/1994 | Bennett, Jr. | ............... | B66C 1/36 24/600.8 |
| 6,070,308 A * | 6/2000 | Rohlf | ...................... | F16B 45/04 24/600.4 |
| 6,401,312 B1 * | 6/2002 | Wang | ...................... | F16B 45/02 24/265 H |
| 7,526,843 B2 * | 5/2009 | Lin | ......................... | F16B 45/04 24/600.2 |
| 8,938,864 B2 * | 1/2015 | Casebolt | ............ | A62B 35/0037 24/573.11 |
| 2003/0070267 A1 * | 4/2003 | Kung | ...................... | F16B 45/04 24/600.5 |

* cited by examiner

*Primary Examiner* — Nkeisha Smith
(74) *Attorney, Agent, or Firm* — Raymond Y. Chan; David and Raymond Patent Firm

(57) ABSTRACT

A safety catch connector includes a catch member, first and second sleeves at two ends of the catch member to define a notch, a locking shaft slidably coupled at the first and second sleeves to selectively open and close the notch, a first controlling unit provided at the first sleeve to releasably lock up the locking shaft at the first sleeve, and a second controlling unit provided at the locking shaft to releasably lock up the locking shaft at the first sleeve, such that the first and second controlling units serves as two safety mechanisms to avoid an unintentional unlocking operation of the locking shaft. The locking shaft is quickly slid to open and close the notch for easy accessing.

16 Claims, 7 Drawing Sheets

SAFETY CATCH CONNECTOR

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention is a safety equipment, and more particular to a safety catch connector, which can be quickly accessed to couple with a plurality of tools with the safety catch and to separately decouple each tool without accidentally dropping the rest of the tools from the safety catch.

2. Description of Related Arts

Catch devices are widely used in construction sites, chimney and roof repairs, or other operation constructions at height to mitigate the effects of gravity and falling. Accordingly, the catch device comprises a lifting lug hooked and fastens with different tools, such as a safety belt, via a catch connector. The connector is illustrated, with a reference character 91, in Taiwan Patent No. 098204798.

However, the prior invention has the following drawbacks.

Firstly, the connector generally comprises an arc-shaped ring member having a notch, and a sleeve member rotatably coupled at the ring member to selectively close or open the notch for holding the tools. Accordingly, if the notch is too big, the operation time for rotating the sleeve member to close or open the notch will be significantly increased. It the notch is too small, it is difficult for the user to quickly couple the tool with the connector through the notch. Therefore, it is always arguable to configure the opening size of the notch to enhance the operation of the sleeve member and to enable the quick access of the connector.

Secondly, the connector of the prior invention cannot sort out different tools, such as the lifting lug of the catch device and a safety belt, so that the lifting lug will unavoidably contact with the safety belt which will wear the safety belt and shorten the life span thereof.

Regarding to the above mentioned issues, the present invention has been carefully researched and developed to address the existing problems of the catch device, so as to eventually come out with the present invention as an improvement of the conventional catch device.

SUMMARY OF THE PRESENT INVENTION

The present invention provides a safety catch connector which comprises the following components.

An elongated catch member, having a generally U-shaped configuration, comprises an elongated retention arm thereof to define a hanging space and a notch which forms at the hanging space, wherein the retention arm has a first sleeve at one end of the retention arm and a second sleeve at an opposed end of the retention arm, such that the first sleeve is coaxially aligned with the second sleeve to define the notch between the first sleeve and the second sleeve. The first sleeve has a first sleeve hole formed at an axial direction of the first sleeve as a through hole, and a locking groove which is radially formed at a bottom side of the first sleeve. The second sleeve has a second sleeve hole formed at an axial direction of the second sleeve to coaxially align with the first sleeve hole of the first sleeve.

An elongated locking shaft has a first end slidably passing through the first sleeve hole of the first sleeve and a second end slidably inserting into the second sleeve hole of the second sleeve, wherein the locking shaft is extended between the first sleeve and the second sleeve to close the notch. The locking shaft has a first engaging slot radially formed at the first end of the locking shaft to align with the first sleeve. The locking shaft further has a manipulating portion, wherein a controlling channel is formed at an end of the manipulating portion at an axial direction thereof. A shaft locking hole is radially formed at the locking shaft between the first end and the second end, wherein the shaft locking hole is a through hole to communicate with the controlling channel and is positioned close to the first sleeve when the locking shaft is coupled between the first sleeve and the second sleeve at a closed position to close the notch.

A first controlling unit comprises a first locking element slidably coupled at the locking groove to slidably dispose at the first sleeve hole, wherein the first locking element has a locking channel formed therewithin. The first controlling unit further comprises a first resilient element disposed in the receiving hole to ensure the top edge of the locking channel being engaged with the first engaging slot of the locking shaft to lock up the locking shaft.

A second controlling unit comprises an elongated controlling latch, a second locking element, and a second resilient element. The controlling latch is slidably coupled at the controlling channel. The second locking element is disposed at each opening end of the shaft locking hole to slidably bias against the outer circumferential surface of the controlling latch. The second resilient element is disposed in the controlling channel to ensure the second locking element to be biased against an inner wall of the first sleeve hole of the first sleeve. In order to open up the notch, the first locking element and the controlling latch must be pressed at the same time to unlock with the locking channel and the second locking element respectively, so as to allow the sliding movement of the locking shaft.

Therefore, the size of the notch of the present invention can be enlarged at the distance between the first sleeve and the second sleeve, such that the safety belt and the lifting lug of the catch device can be easily accessed through the enlarged notch via the coupling and decoupling operations. It further controls the sliding movement of the locking shaft at the first sleeve hole and the second sleeve hole through the first controlling unit and the second controlling unit to save the operational time of locking and unlocking operation of the present invention. Besides, the locking shaft is long enough that the safety belt can be directly wound around the locking shaft while the lifting lug of the catch device is held at the retention arm, such that the safety belt will not be directly contacted with the lifting lug of the catch device. In other words, the metal lifting lug will keep away from the safety belt to prevent the safety belt from being worn or hit by the lifting lug, so as to greatly prolong the life span of the safety belt.

These and other objectives, features, and advantages of the present invention will become apparent from the following detailed description, the accompanying drawings, and the appended claims.

DETAILED DESCRIPTION OF THE PREFERRED EMBODIMENT

Figure 1:
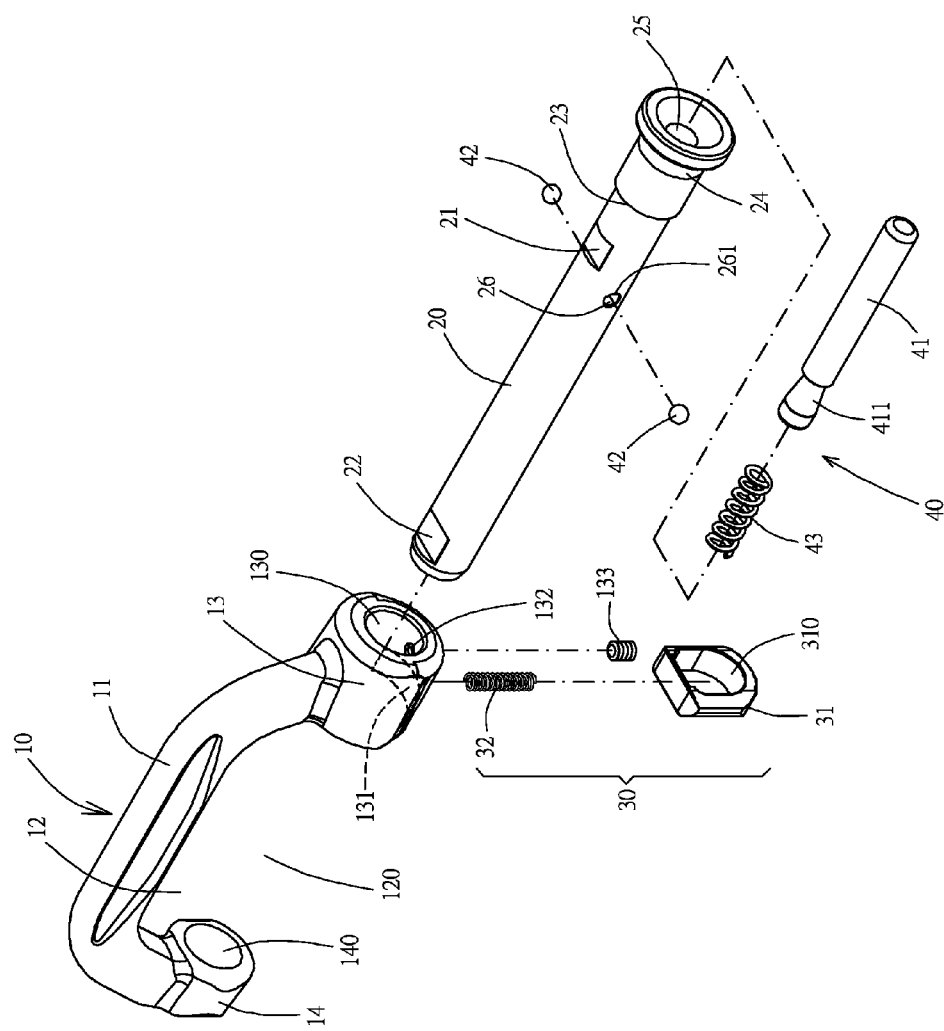
FIG. 1 is an exploded perspective view of a safety catch connector according to a preferred embodiment of the present invention.
Figure 2:
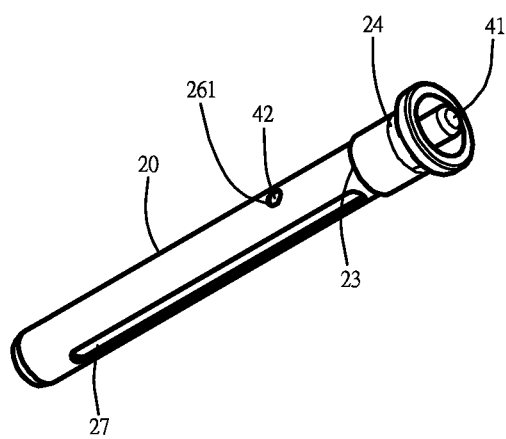
FIG. 2 is a perspective view of the locking latch of the safety catch connector according to above preferred embodiment of the present invention.
Figure 3:
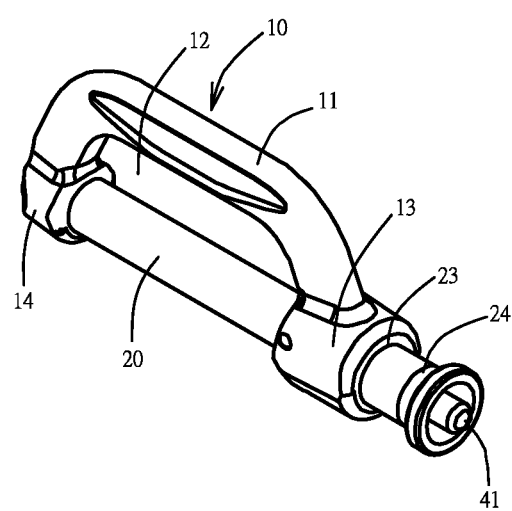
FIG. 3 is a perspective view of the safety catch connector according to above preferred embodiment of the present invention, illustrating the closed position of the safety catch connector.
Figure 4:
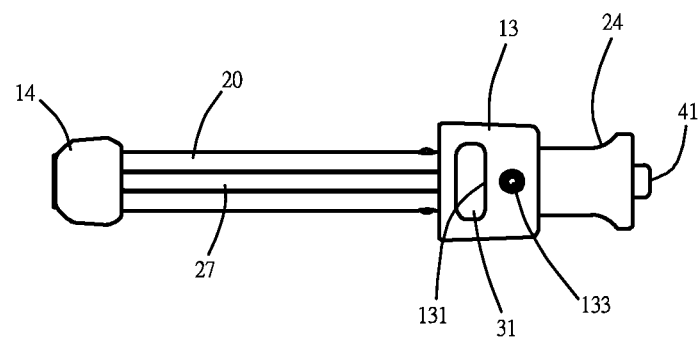
FIG. 4 is a bottom view of the safety catch connector according to above preferred embodiment of the present invention.
Figure 5:
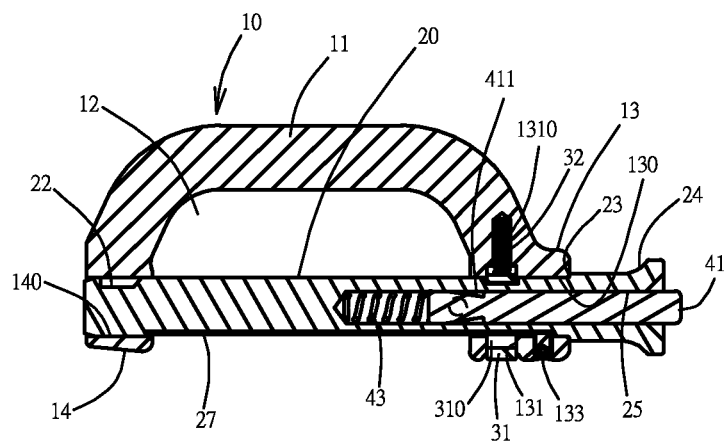
FIG. 5 is a sectional view of the safety catch connector according to above preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Please refer to FIGS. 1 to 5, a safety catch connector according to the present invention comprises the following components.

An elongated catch member 10, having a generally U-shaped configuration, comprises an elongated retention arm 11 thereof to define a hanging space 12 below the retention arm and a notch 120 which forms at the hanging space 12 and faces downward with respect to the retention arm 11. The retention arm 11 has a first sleeve 13 (right sleeve) at one end of the retention arm 11 to align with one side of the notch 120 and a second sleeve 14 (a left sleeve) at an opposed end of the retention arm 11 to align with another side of the notch 120, such that the first sleeve 13 is coaxially aligned with the second sleeve 14 to define the notch 120 between the first sleeve 13 and the second sleeve 14. The first sleeve 13 has a first sleeve hole 130 formed at an axial direction of the first sleeve as a through hole, and a locking groove 131 which is radially formed at a bottom side of the first sleeve 13 and is upwardly extended to communicate with the first sleeve hole 130. The catch member 10 further has a receiving hole 1310 formed at the retention arm 11 to align with the locking groove 131. A fastener hole 132 is formed at the first sleeve 13 at a position adjacent to the locking groove 131 to communicate with the first sleeve hole 130, wherein a fastener 133, such as a screw, is detachably engaged with the fastener hole 132 at a position that a head portion of the fastener 133 is extended through the fastener hole 132 to protrude within the first sleeve hole 130. The second sleeve 14 has a second sleeve hole 140 formed at an axial direction of the second sleeve 14 to coaxially align with the first sleeve hole 130 of the first sleeve 13.

An elongated locking shaft 20 has a first end (right end) slidably passing through the first sleeve hole 130 of the first sleeve 13 and a second end (left end) slidably inserting into the second sleeve hole 140 of the second sleeve 14, wherein the locking shaft 20 is extended between the first sleeve 13 and the second sleeve 14 to close the notch 120. Preferably, the locking shaft 20 has a uniform diameter between the first end and the second end. The locking shaft 20 has a first engaging slot 21 radially formed at the first end of the locking shaft 20 to align with the first sleeve 13 and a second engaging slot 22 radially formed at the second end of the locking shaft 20 to align with the second sleeve 14. Accordingly, the locking shaft 20 further has a shoulder portion 23 integrally and coaxially extended from the first end, wherein a diameter of the shoulder portion 23 is larger than that of the first end. The locking shaft 20 further has a manipulating portion 24 integrally and coaxially extended from the shoulder portion 23, wherein a diameter of the manipulating portion 24 is gradually increased from the shoulder portion 23. A controlling channel 25 is formed at an end of the manipulating portion 24 at an axial direction thereof. A shaft locking hole 26 is radially formed at the locking shaft 20 between the first end and the second end, wherein the shaft locking hole 26 is a through hole to communicate with the controlling channel 25 and is positioned close to the first sleeve 13 when the locking shaft 20 is coupled between the first sleeve 13 and the second sleeve 14 at a closed position to close the notch 120. Two opening ends of the shaft locking hole 26, i.e. formed on an outer circumferential surface of the locking shaft 20, are riveted to form a narrowed neck 261 with a reduced diameter size. The locking shaft 20 further has an elongated keyway 27 extended between the first end and the second end at the bottom side of the locking shaft 20. In particular, the keyway 27 is extended from the fastener hole 132, such that the head portion of the fastener 133 is slidably engaged with the keyway 27.

A first controlling unit 30 comprises a first locking element 31 slidably coupled at the locking groove 131 to slidably disposed at the first sleeve hole 130, wherein the first locking element 31 has a locking channel 310 formed therewithin. Accordingly, the locking channel 310 is big enough for the locking shaft 20 passing therethrough. The first controlling unit 30 further comprises a first resilient element 32, such as a compression spring, disposed in the receiving hole 1310, wherein a bottom end of the resilient element 32 is biased against a top side of the first locking element 31 to push a bottom side of the first locking element 31 out of the first sleeve hole 130 of the first sleeve 13 while the top edge of the locking channel 310 is engaged with the first engaging slot 21 of the locking shaft 20 to lock up the locking shaft 20 as a first safety mechanism.

A second controlling unit 40 comprises an elongated controlling latch 41, a second locking element 42, and a second resilient element 43, such as another compression spring. The controlling latch 41 is slidably coupled at the controlling channel 25, wherein a wedging groove 411, having a slanted surface, is radially indented at one end portion of the controlling latch 41. The second locking element 42, having a ball shape, is disposed at each opening end of the shaft locking hole 26 to slidably bias against the outer circumferential surface of the controlling latch 41. In particular, a diameter of the second locking element 42 is larger than the diameter of the narrowed neck 261 of the shaft locking hole 26 and is smaller than the diameter of the shaft locking hole 26, such that the second locking element 42 is securely retained at the narrowed neck 261 of the shaft locking hole 26 and is pushed outwardly by the controlling latch 41. The second resilient element 43 is disposed in the controlling channel 25 to bias against an inner end of the controlling latch 41 at a position that an outer end of the controlling latch 41 is pushed out of the manipulating portion 24 of the locking shaft 20. It is worth mentioning that the second locking element 42 is slidably biased against the outer circumferential surface of the controlling latch 41 to restrict the position of the second locking element 42 at the narrowed neck 261 of the shaft locking hole 26, such that the second locking elements 42 are radially and outwardly pushed to protrude at the outer circumferential surface of the locking shaft 20 to bias against the inner wall of the first sleeve hole 130 of the first sleeve 13 as a second safety mechanism.

Figure 6:
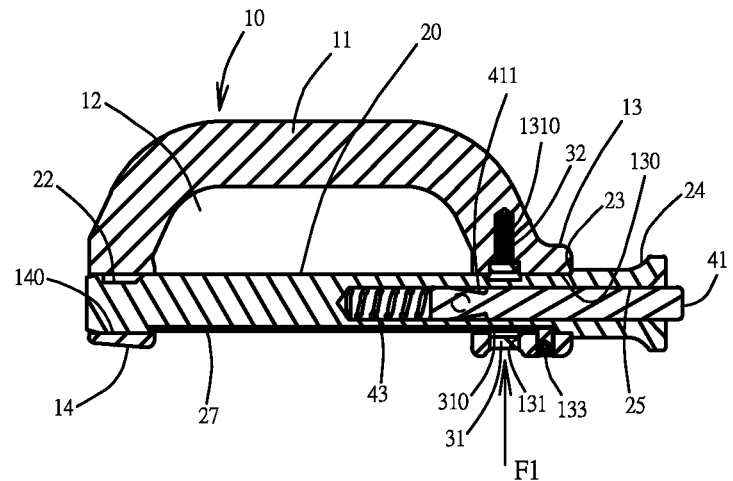
FIG. 6 is a side sectional view of the safety catch connector according to above preferred embodiment of the present invention, illustrating the unlocked position of the safety catch connector.
Figure 7:
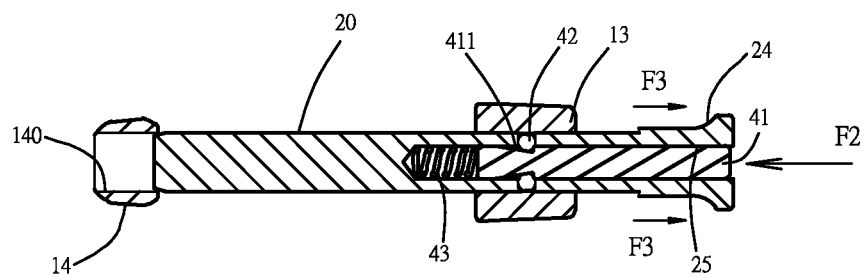
FIG. 7 is a bottom sectional view of the safety catch connector according to above preferred embodiment of the present invention, illustrating the unlocked position of the safety catch connector.
Figure 8:
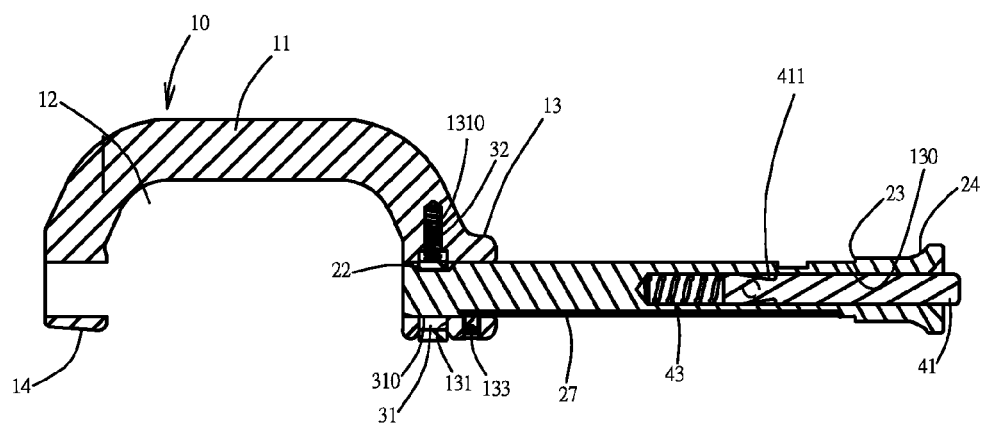
FIG. 8 is a sectional view of the safety catch connector according to above preferred embodiment of the present invention, illustrating the opened position of the safety catch connector.
Figure 9:
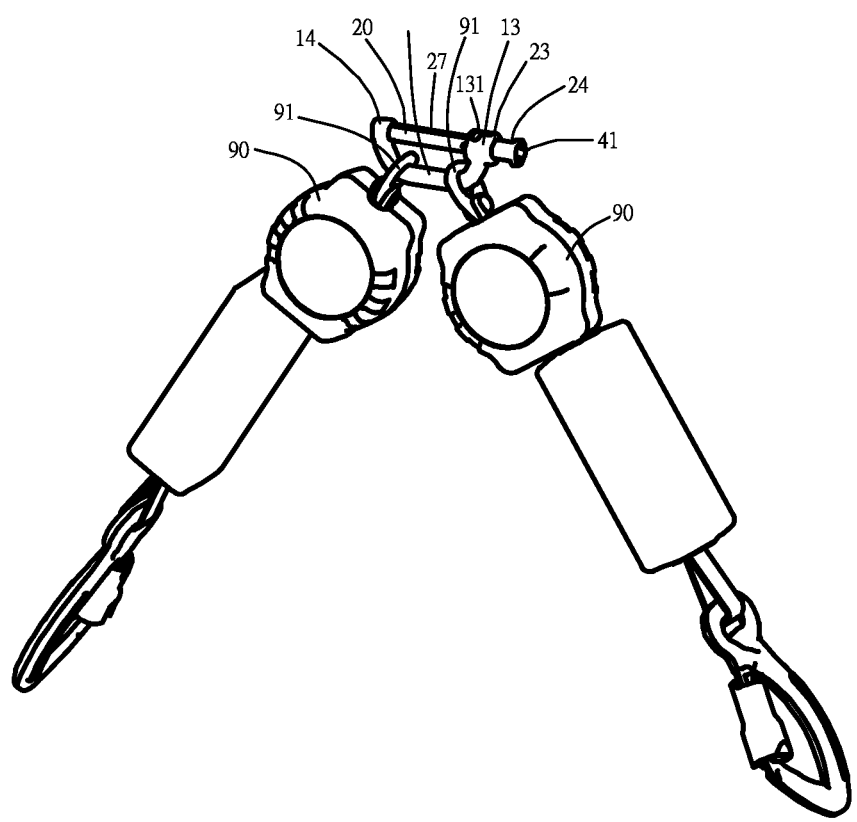
FIG. 9 is a perspective view of the safety catch connector according to above preferred embodiment of the present invention, illustrating the safety catch connector securely coupling with different tools.

According to the above structural descriptions, it is appreciated that the present invention provides the first controlling unit 30 and the second controlling unit 40 to form a double safety configuration to close the notch 120 by the locking shaft 20 so as to avoid any unintentional unlocking operation of the locking shaft 20. In order to unlock the locking shaft 20 to open up the notch 120, as shown in FIGS. 6 and 7, a user is able to reach and press the bottom side of the first locking element 31 and the outer end of the controlling latch 41 by one hand or both hands. When the bottom side of the first locking element 31 is pressed to lift up the first locking element 31 in order to overcome the resilient force, i.e. the spring force, of the first resilient element 32, the top edge of the locking channel 310 is disengaged with the first engaging slot 21 of the locking shaft 20. At the same time, when the outer end of the controlling latch 41 is pressed to push the controlling latch 41 into the controlling channel 25 in order to overcome the resilient force, i.e. the spring force, of the second resilient element 42, the second locking elements 42 are guided at the wedging groove 411 of the controlling latch 41 at the slanted surface thereof to radially and inwardly move away from the inner wall of the first sleeve hole 130. As a result, the locking shaft 20 is unlocked and is adapted to slide at the first sleeve 13 and the second sleeve 14, as shown in FIGS. 7 and 8, so as to open up the notch 120. In other words, the second end of the locking latch 20 is slid out of the second sleeve hole 140 and is slid toward the first sleeve hole 130 of the first sleeve hole 130 to open up the notch 120. It is worth mentioning that the head portion of the fastener 133 is slidably engaged with the keyway 27 such that when the locking shaft 20 is slid between the opened position and the closed position, the head portion of the fastener 133 is located along the keyway 27 to prevent an unwanted rotatable movement of the locking shaft 20 during the axially sliding movement thereof. When the locking shaft 20 is slid to locate the second engaging slot 22 at the first sleeve hole 130 of the first sleeve 13, the pressing force at the bottom side of the first locking element 31 can be released. Therefore, the first locking element 31 is pushed to return back to its original position by the first resilient element 32, such that the top edge of the locking channel 310 is engaged with the second engaging slot 22 of the locking shaft 20 to lock up the locking shaft 20 at the first sleeve 13 so as to prevent the locking shaft 20 from being entirely detached from the catch member 10. As shown in FIG. 9, the retention arm 11 of the present invention is able to hold the lifting lugs 91 of the safety catch devices 90, wherein the safety belt can be wound around the locking shaft 20 of the present invention.

Hence, the present invention has the following advantages.

Firstly, the size of the notch 120 of the present invention can be enlarged at the distance between the first sleeve 13 and the second sleeve 14, such that the safety belt and the lifting lug 91 of the catch device can be easily accessed through the enlarged notch 120 via the coupling and decoupling operations. It further controls the sliding movement of the locking shaft 20 at the first sleeve hole 130 and the second sleeve hole 140 through the first controlling unit 30 and the second controlling unit 40 to save the operational time of locking and unlocking operation of the present invention in comparison with the rotational locking and unlocking operation of the prior art.

Secondly, a safety belt can be directly wound around the locking shaft 20 while the lifting lug 91 of the catch device 90 is held at the retention arm 11, such that the safety belt will not be directly contacted with the lifting lug 91 of the catch device 90. In other words, the metal lifting lug will keep away from the safety belt to prevent the safety belt from being worn or hit by the lifting lug, so as to greatly prolong the life span of the safety belt.

All in all, the overall structural characteristic of the present invention can be unprecedented in all current structures, which is also an excellent and outstanding design that similar invention or publish have both never been found in the same category. Therefore the present invention meets the application requirements of patent of an invention, and is lawfully submitted to apply for the patent accordingly.

However, the above descriptions are only a preferred embodiment of the present invention, but not to be used to confine the scope of embodying the present invention, which means all equivalent varieties and modifications based on the appended claims of the present invention are within the scope of the present invention.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A safety catch connector, comprising:
an elongated catch member comprising an elongated retention arm providing a hanging space and a notch which forms at said hanging space, a first sleeve formed at one end of said retention arm, and a second sleeve at an opposed end of said retention arm to define said notch between said first sleeve and said second sleeve, wherein said first sleeve has a first sleeve hole formed at an axial direction and a locking groove which is radially formed at a bottom side of said first sleeve, wherein said second sleeve has a second sleeve hole formed at an axial direction to coaxially align with said first sleeve hole of said first sleeve;
an elongated locking shaft having a first end slidably passing through said first sleeve hole of said first sleeve and a second end slidably inserting into said second sleeve hole of said second sleeve to close said notch, wherein said locking shaft further has a first engaging slot radially formed at said first end of said locking shaft to align with said first sleeve and a manipulating portion extended from said first end, wherein a controlling channel is formed at an end of said manipulating portion at an axial direction thereof, wherein a shaft locking hole is radially formed at said locking shaft between said first end and said second end to communicate with said controlling channel and is positioned close to said first sleeve when said locking shaft is coupled between said first sleeve and said second sleeve at a closed position to close said notch;

a first controlling unit comprising a first locking element slidably coupled at said locking groove to slidably disposed at said first sleeve hole, wherein said first locking element has a locking channel formed therewithin, wherein said first controlling unit further comprises a first resilient element biasing against said first locking element to ensure a top edge of the locking channel being engaged with said first engaging slot of said locking shaft to lock up said locking shaft; and a second controlling unit comprising an elongated controlling latch slidably coupled at said controlling channel, a second locking element disposed at an opening end of said shaft locking hole to slidably bias against an outer circumferential surface of said controlling latch, and a second resilient element disposed in said controlling channel to ensure said second locking element to be biased against an inner wall of said first sleeve hole of said first sleeve, wherein in order to open up said notch, said first locking element and said controlling latch are pressed at the same time to unlock with said locking channel and said second locking element respectively, so as to allow a sliding movement of said locking shaft.

2. The safety catch connector, as recited in claim 1, wherein said locking shaft is an elongated shaft for a safety belt being wound therearound and said retention arm is adapted for holding at least one lifting lug of a catch device.

3. The safety catch connector, as in claim 2, wherein said catch member further has a fastener hole formed at said first sleeve to communicate with said first sleeve hole and comprises a fastener engaged with said fastener hole at a position that a head portion of said fastener is extended through said fastener hole to protrude within said first sleeve hole, wherein said locking shaft further has an elongated keyway, wherein said head portion of said fastener is slidably engaged with said keyway.

4. The safety catch connector, as in claim 2, wherein a narrowed neck with a reduced diameter size is formed at each opening end of said shaft locking hole, wherein said controlling latch has a wedging groove radially indented at one end portion thereof, wherein said second locking element, having a ball shape, is disposed at each narrowed neck of said shaft locking hole to slidably bias against an outer circumferential surface of said controlling latch, wherein a diameter of said second locking element is larger than a diameter of said narrowed neck of said shaft locking hole and is smaller than a diameter of said shaft locking hole, wherein said second locking elements are radially and outwardly pushed to protrude at an outer circumferential surface of said locking shaft to bias against an inner wall of said first sleeve hole of said first sleeve as a second safety mechanism.

5. The safety catch connector, as in claim 2, wherein said locking shaft further has a second engaging slot radially formed at the second end thereof, wherein when said locking shaft is slid to locate said second engaging slot at said first sleeve hole of said first sleeve, said first locking element is released to lock at said second engaging slot to prevent said locking shaft from being entirely detached from said catch member.

6. The safety catch connector, as recited in claim 1, wherein said locking groove is a through hole radially formed at said first sleeve to communicate with said first sleeve hole, wherein said first locking element has a locking channel formed therewithin for said locking shaft passing therethrough.

7. The safety catch connector, as in claim 6, wherein said catch member further has a fastener hole formed at said first sleeve to communicate with said first sleeve hole and comprises a fastener engaged with said fastener hole at a position that a head portion of said fastener is extended through said fastener hole to protrude within said first sleeve hole, wherein said locking shaft further has an elongated keyway, wherein said head portion of said fastener is slidably engaged with said keyway.

8. The safety catch connector, as in claim 6, wherein a narrowed neck with a reduced diameter size is formed at each opening end of said shaft locking hole, wherein said controlling latch has a wedging groove radially indented at one end portion thereof, wherein said second locking element, having a ball shape, is disposed at each narrowed neck of said shaft locking hole to slidably bias against an outer circumferential surface of said controlling latch, wherein a diameter of said second locking element is larger than a diameter of said narrowed neck of said shaft locking hole and is smaller than a diameter of said shaft locking hole, wherein said second locking elements are radially and outwardly pushed to protrude at an outer circumferential surface of said locking shaft to bias against an inner wall of said first sleeve hole of said first sleeve as a second safety mechanism.

9. The safety catch connector, as in claim 6, wherein said locking shaft further has a second engaging slot radially formed at the second end thereof, wherein when said locking shaft is slid to locate said second engaging slot at said first sleeve hole of said first sleeve, said first locking element is released to lock at said second engaging slot to prevent said locking shaft from being entirely detached from said catch member.

10. The safety catch connector, as recited in claim 6, wherein said locking groove is a through hole radially formed at a bottom side of said first sleeve and is upwardly extended to communicate with said first sleeve hole, wherein said catch member further has a receiving hole formed at said retention arm to align with said locking groove, wherein said first controlling unit further comprises a first resilient element disposed in said receiving hole, wherein a bottom end of said resilient element is biased against a top side of said first locking element to push a bottom side of said first locking element out of said first sleeve while a top edge of said locking channel is engaged with said first engaging slot of said locking shaft to lock up said locking shaft as a first safety mechanism.

11. The safety catch connector, as in claim 10, wherein said catch member further has a fastener hole formed at said first sleeve to communicate with said first sleeve hole and comprises a fastener engaged with said fastener hole at a position that a head portion of said fastener is extended through said fastener hole to protrude within said first sleeve hole, wherein said locking shaft further has an elongated keyway, wherein said head portion of said fastener is slidably engaged with said keyway.

12. The safety catch connector, as in claim 10, wherein a narrowed neck with a reduced diameter size is formed at each opening end of said shaft locking hole, wherein said controlling latch has a wedging groove radially indented at one end portion thereof, wherein said second locking element, having a ball shape, is disposed at each narrowed neck of said shaft locking hole to slidably bias against an outer circumferential surface of said controlling latch, wherein a diameter of said second locking element is larger than a diameter of said narrowed neck of said shaft locking hole and is smaller than a diameter of said shaft locking hole, wherein said second locking elements are radially and outwardly pushed to protrude at an outer circumferential surface of said locking shaft to bias against an inner wall of said first sleeve hole of said first sleeve as a second safety mechanism.

13. The safety catch connector, as in claim 10, wherein said locking shaft further has a second engaging slot radially formed at the second end thereof, wherein when said locking shaft is slid to locate said second engaging slot at said first sleeve hole of said first sleeve, said first locking element is released to lock at said second engaging slot to prevent said locking shaft from being entirely detached from said catch member.

14. The safety catch connector, as in claim 1, wherein said catch member further has a fastener hole formed at said first sleeve to communicate with said first sleeve hole and comprises a fastener engaged with said fastener hole at a position that a head portion of said fastener is extended through said fastener hole to protrude within said first sleeve hole, wherein said locking shaft further has an elongated keyway, wherein said head portion of said fastener is slidably engaged with said keyway.

15. The safety catch connector, as in claim 1, wherein a narrowed neck with a reduced diameter size is formed at each opening end of said shaft locking hole, wherein said controlling latch has a wedging groove radially indented at one end portion thereof, wherein said second locking element, having a ball shape, is disposed at each narrowed neck of said shaft locking hole to slidably bias against an outer circumferential surface of said controlling latch, wherein a diameter of said second locking element is larger than a diameter of said narrowed neck of said shaft locking hole and is smaller than a diameter of said shaft locking hole, wherein said second locking elements are radially and outwardly pushed to protrude at an outer circumferential surface of said locking shaft to bias against an inner wall of said first sleeve hole of said first sleeve as a second safety mechanism.

16. The safety catch connector, as in claim 1, wherein said locking shaft further has a second engaging slot radially formed at the second end thereof, wherein when said locking shaft is slid to locate said second engaging slot at said first sleeve hole of said first sleeve, said first locking element is released to lock at said second engaging slot to prevent said locking shaft from being entirely detached from said catch member.

* * * * *